June 28, 1932. D. E. AUSTIN 1,864,710
VEHICLE AND SLEEPING BERTH CONSTRUCTION
Filed April 2, 1928 7 Sheets-Sheet 1
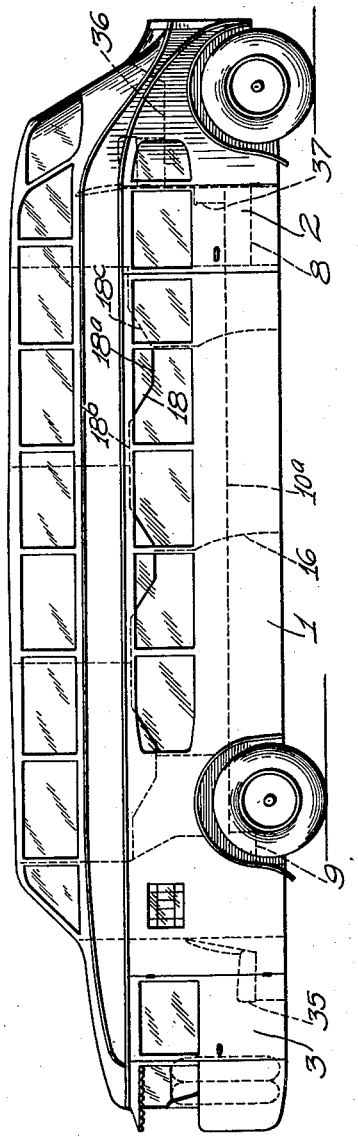
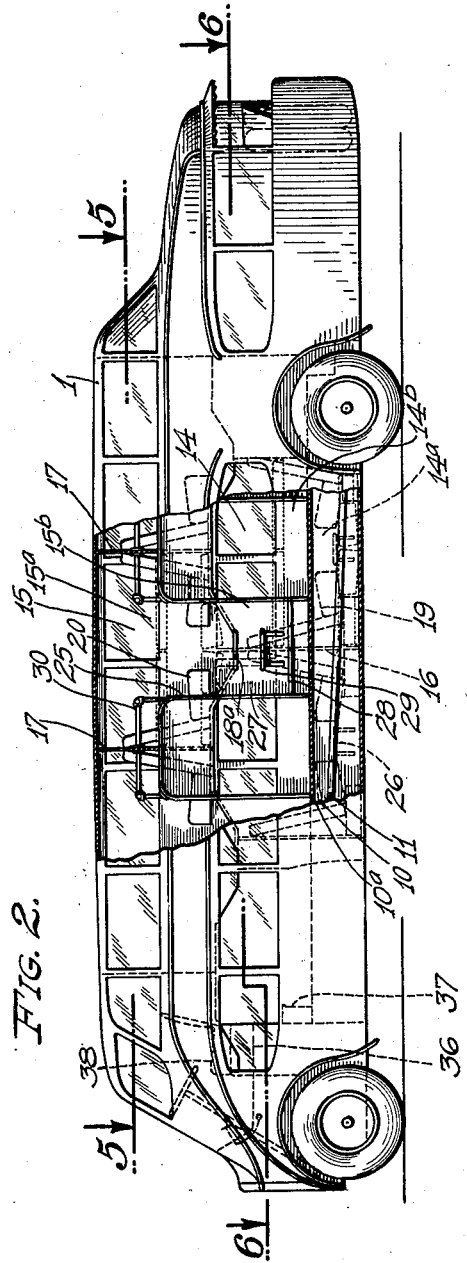
INVENTOR.
DWIGHT E. AUSTIN
BY A. B. Bowman
ATTORNEY June 28, 1932.  D. E. AUSTIN  1,864,710
VEHICLE AND SLEEPING BERTH CONSTRUCTION
Filed April 2, 1928   7 Sheets-Sheet 2
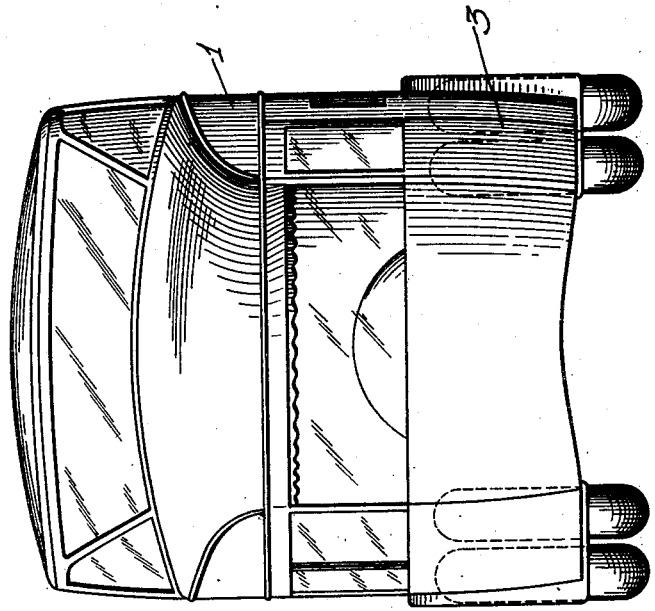
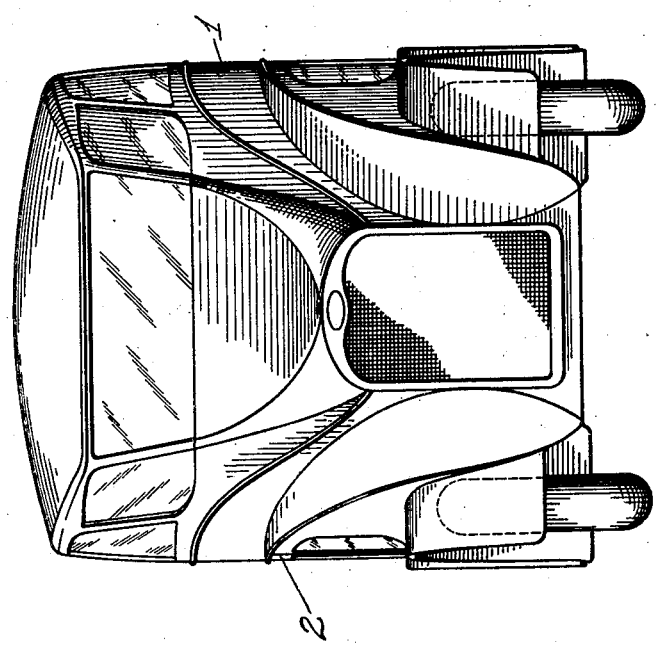
INVENTOR.
DWIGHT E. AUSTIN
BY A. B. Bowman
ATTORNEY

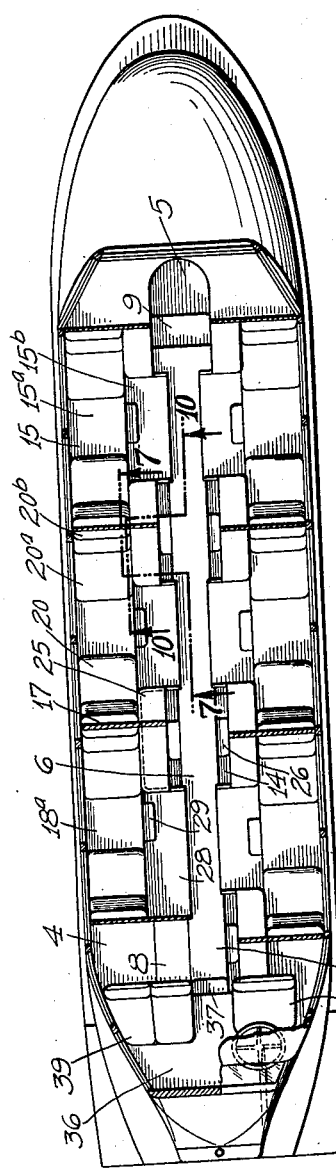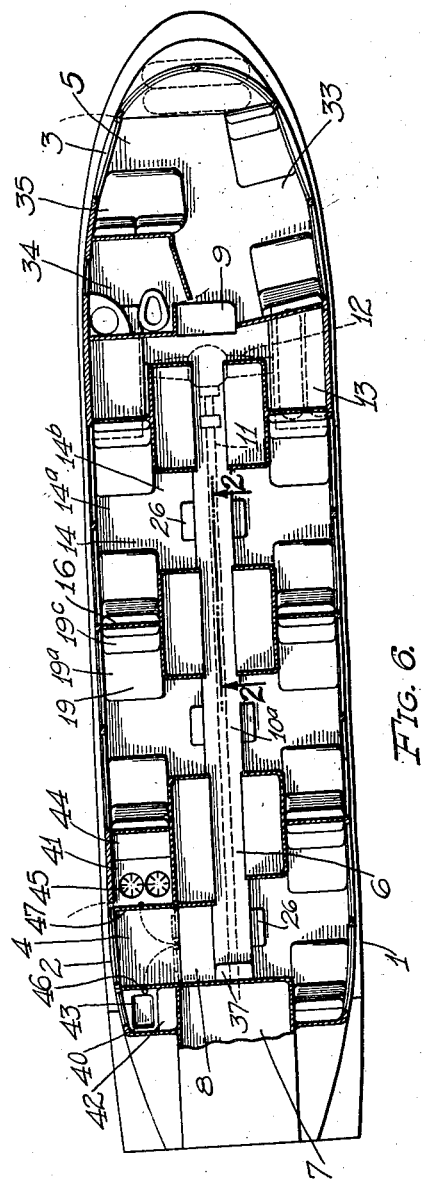

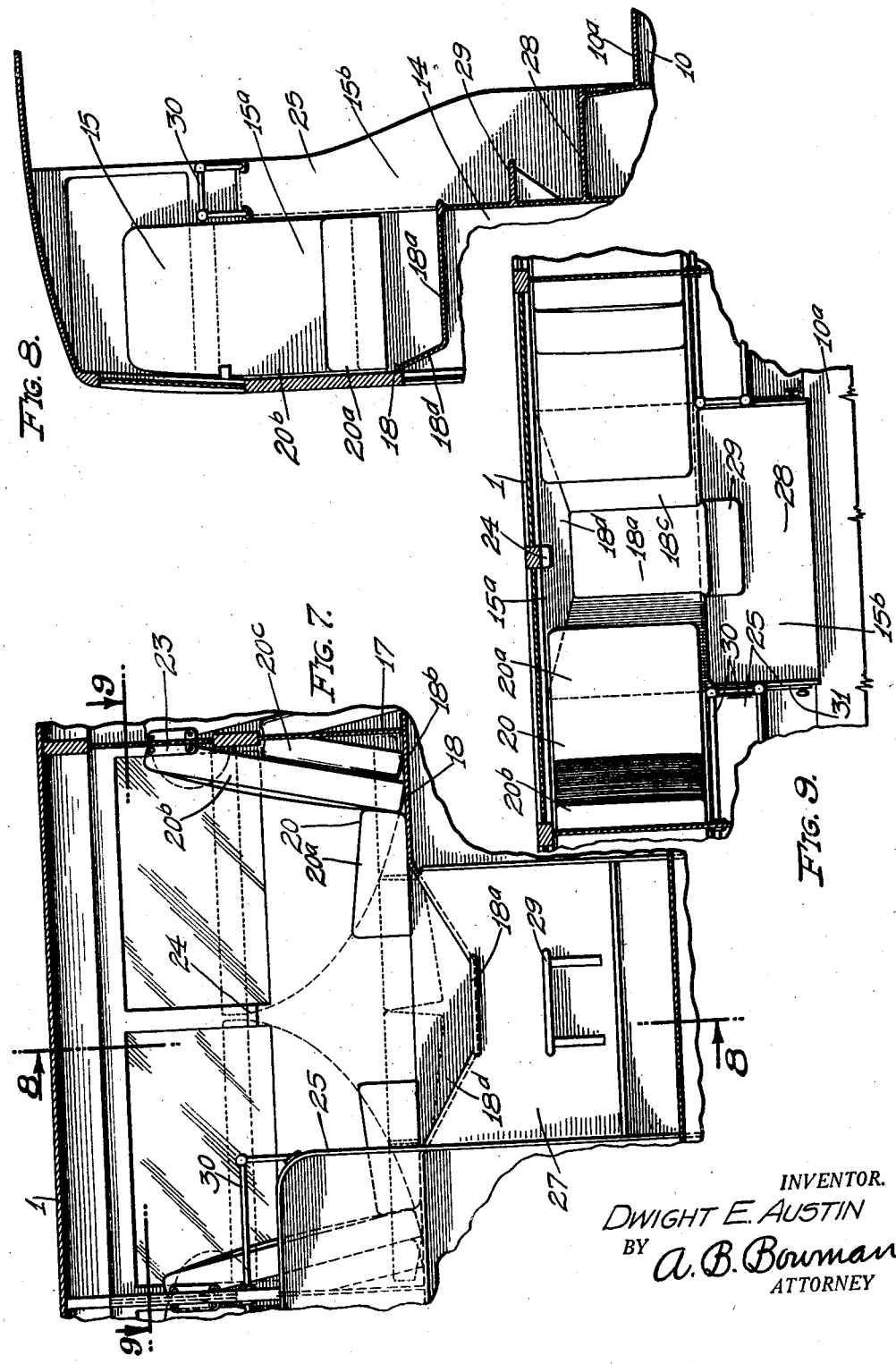

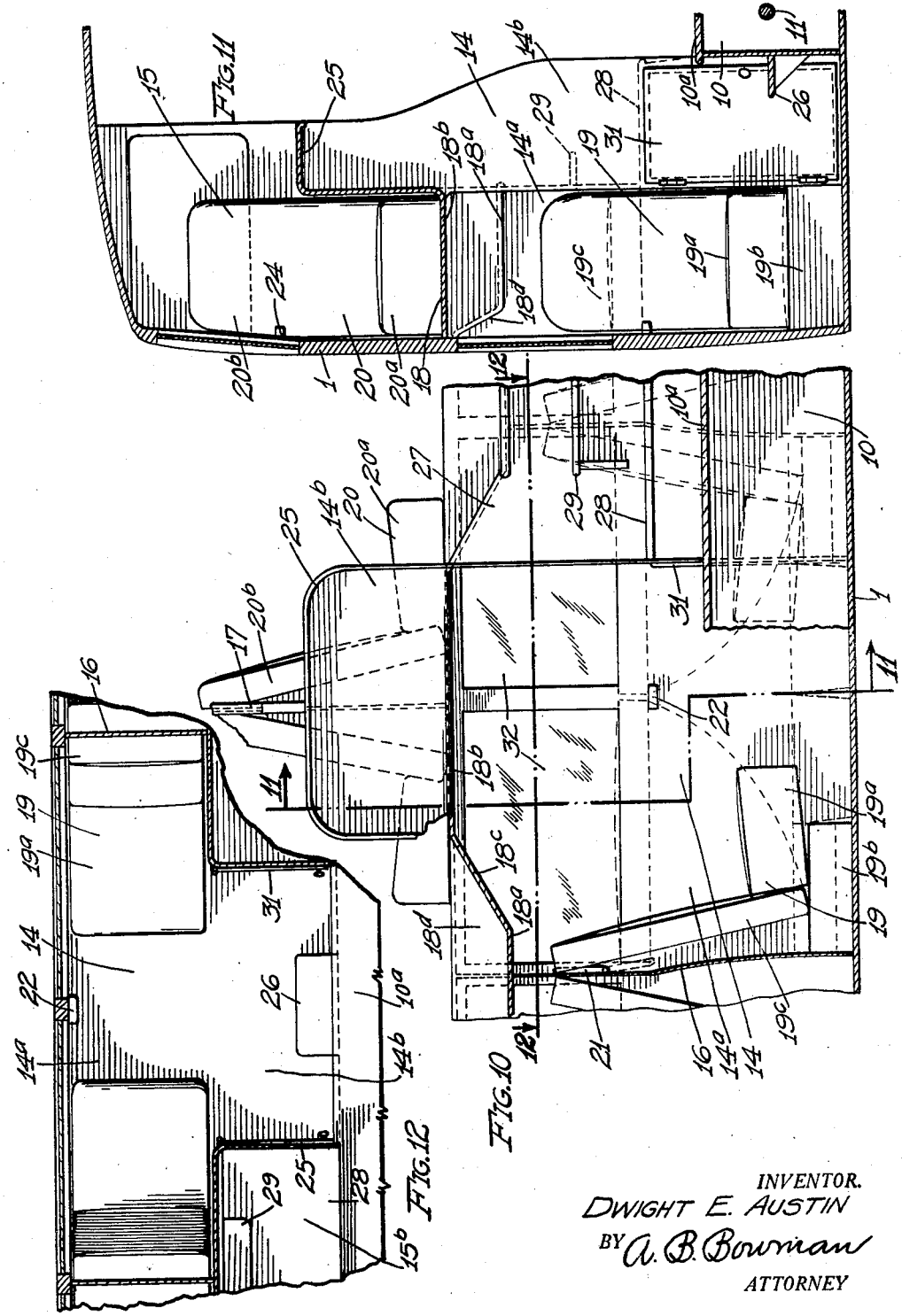

June 28, 1932. D. E. AUSTIN 1,864,710
VEHICLE AND SLEEPING BERTH CONSTRUCTION
Filed April 2, 1928 7 Sheets-Sheet 6
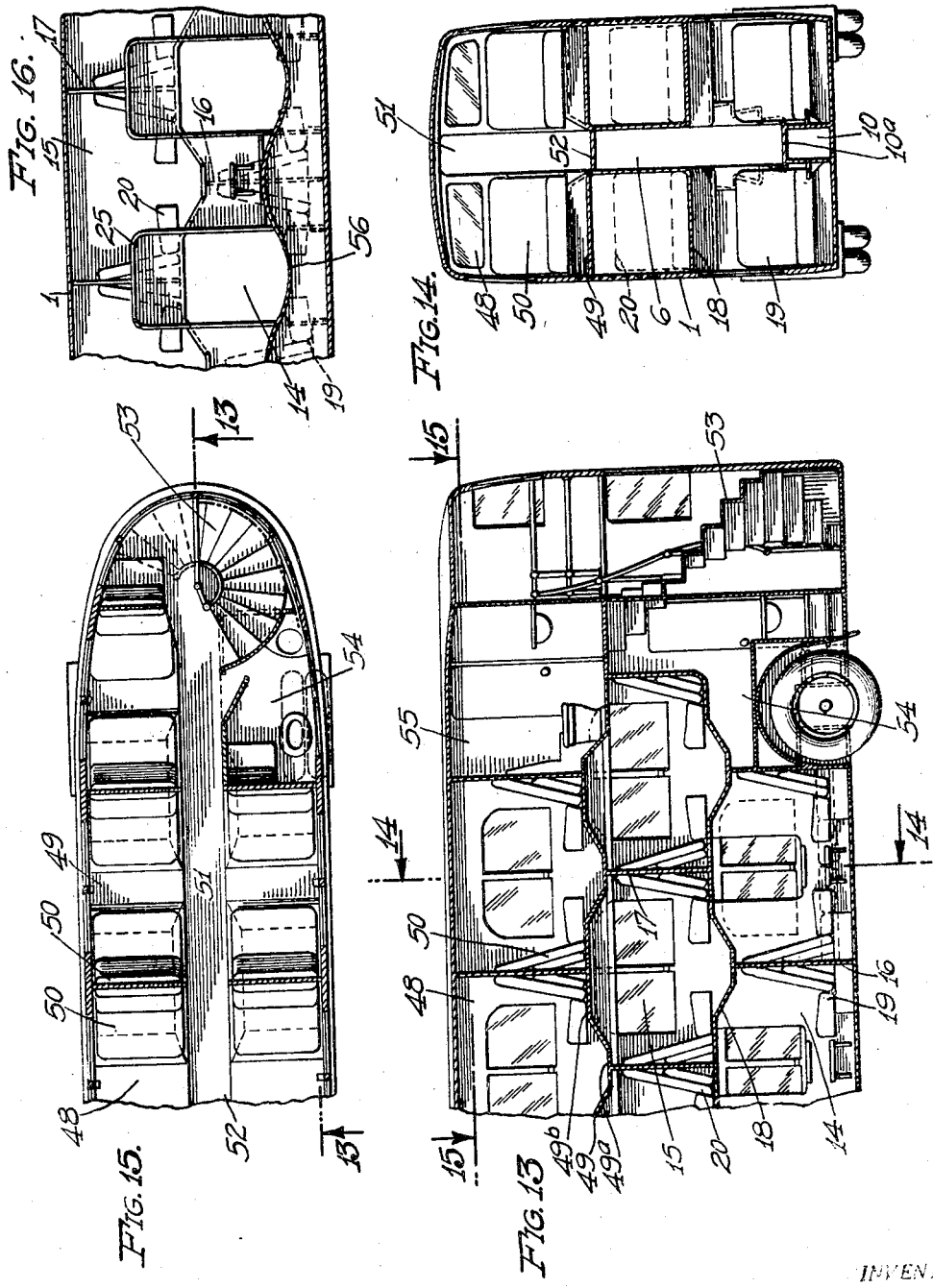
INVENTOR.
DWIGHT E. AUSTIN
BY A. B. Bowman
ATTORNEY

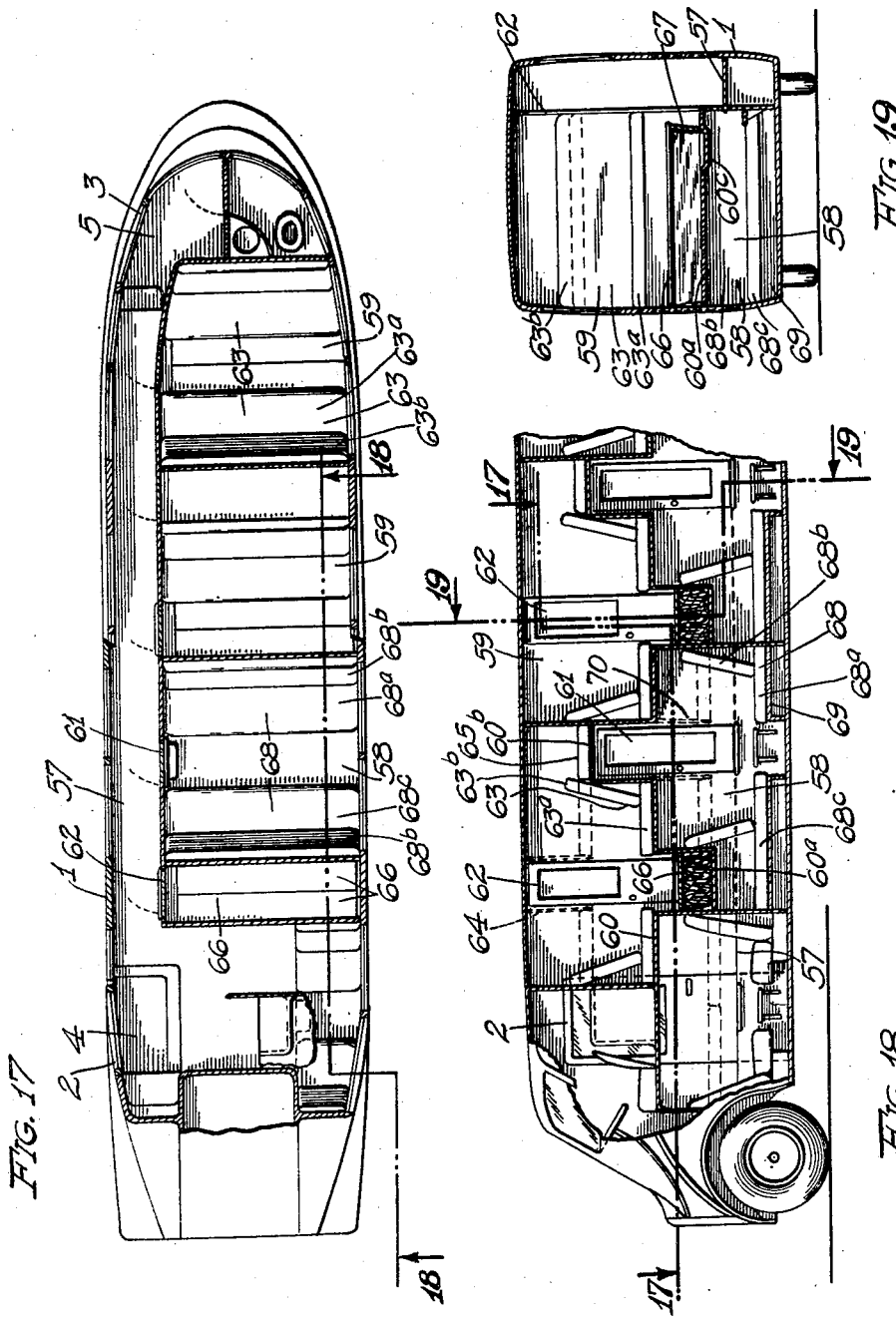

Patented June 28, 1932

1,864,710

UNITED STATES PATENT OFFICE

DWIGHT E. AUSTIN, OF LOS ANGELES, CALIFORNIA

VEHICLE AND SLEEPING BERTH CONSTRUCTION

Application filed April 2, 1928. Serial No. 266,709.

My invention relates to vehicle and sleeping berth construction.

The objects of my present invention are: first, to provide a vehicle body whereby the passenger carrying capacity is doubled over the normal carrying capacity of vehicles with only slight increase of height of the vehicle body; second, to provide a vehicle having a plurality of compartments positioned on different levels and in staggered relation to each other and common means of ready access to each of said compartments at both levels; third, to provide a vehicle structure of this class whereby access may be had to compartments at a higher level from a common corridor without necessitating the placing of steps, or a ladder, or stool, in the corridor to permit and facilitate ingress and egress to and from the compartments at the higher level; fourth, to provide a vehicle body structure having a plurality of compartments positioned at different levels in staggered relation to each other and provided with low seating compartments but with high standing compartments immediately to the side of the seating compartments adjacent the common corridor for the compartments at the different levels; fifth, to provide a structure of this class having a continuous unbroken corridor from front to rear and passenger compartments to the side of the corridor, some of said compartments being positioned below the floor level of the corridor and others above the floor level of the corridor, the latter being positioned in staggered relation relative to the former, both the lower and the higher compartments being readily accessible from the common corridor; sixth, to provide a sleeping berth arrangement whereby the sleeping space, particularly as employed in vehicles, is doubled; seventh, to provide a sleeping berth arrangement whereby substantially four superimposed berths may be readily and conveniently accessible at all times without the employment of auxiliary step ladders, and the like; eighth, to provide a sleeping berth construction whereby a pair of superimposed berths may be formed in compartments at different levels and in staggered relation to each other and all communicating with and readily accessible to a common corridor; ninth, to provide a sleeping berth construction whereby each berth, or each set of berths, arranged in compartments at different levels may be provided with a dressing room immediately adjacent the berths and in the same compartments therewith; tenth, to provide an arrangement of sleeping berths in compartments positioned at different elevations, the portions of the compartments in which the berths are positioned being of less than ordinary standing height, but provided with portions immediately adjacent thereto permitting convenient standing room and forming dressing rooms for the adjacent berths; eleventh, to provide a vehicle body having a plurality of substantially private compartments arranged at different levels, each having low sleeping spaces and high convenient standing and dressing spaces immediately outside of the sleeping spaces, the standing and dressing spaces communicating with a common corridor; twelfth, to provide a structure of this class having adjacent compartments in which portions of some are positioned over portions of the others for economy of space and in which sleeping berths in the first are positioned over berths in the latter so that limited but private sleeping space is provided in each commensurate with the greatest economy of space; thirteenth, to provide a pair of superimposed berths which may be formed from a pair of seats, the back portions of the seats forming the upper berth and the seat portions thereof forming a part of the lower berth; fourteenth, to provide a sleeping berth arrangement which is particularly adapted for automobile stages, although the same may be readily applied to all other forms of vehicles used for transportation in which economy of space, privacy and convenience is desired; fifteenth, to provide a novel vehicle body structure in which sleeping berths are arranged at the opposite sides of a convenient central corridor and which are provided with dressing rooms in connection therewith; sixteenth, to provide as a whole a novelly constructed vehicle body, a novel seating arrangement, a novel sleeping arrangement, a novel berth and dressing room arrangement, and a novel arrangement of such seats, berths and dressing rooms in adjacent compartments; seventeenth, to provide a vehicle structure having a tunnel extending from front to rear for receiving and housing power transmission means for propelling mechanism at the rear of the vehicle, the top of the tunnel serving as an elevated corridor from which access may be had directly to compartments positioned at the sides of the corridor; eighteenth, to provide a vehicle structure in which otherwise unused space is utilized as a kitchenette which kitchenette may be separated from the main interior of the vehicle by swinging doors used to enclose cabinets of the kitchenette; and, nineteenth, to provide a structure and arrangement of this class which is simple and economical of construction proportionate to its functions and advantages, convenient, compact, durable, and attractive in appearance.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a side elevational view of an automobile stage incorporating my invention in one form, the view being taken from the right side of the automobile stage, showing the entrance and exit means thereof; Fig. 2 is another side elevational view thereof taken from the opposite side, showing certain parts and portions broken away and in section to facilitate the illustration, the sectional portion being taken at 2—2 of Fig. 6, the dotted lines showing the arrangement of sleeping berths in one form; Fig. 3 is an enlarged front elevational view thereof; Fig. 4 is an enlarged rear elevational view thereof; Fig. 5 is a longitudinal sectional view thereof in plan taken through 5—5 of Fig. 2, showing certain parts in full plan to facilitate the illustration and showing particularly the arrangement of the upper compartments; Fig. 6 is another longitudinal sectional view thereof in plan taken at 6—6 of Fig. 2 showing particularly the arrangement of the lower compartments; Fig. 7 is an enlarged fragmentary sectional elevational view taken at 7—7 of Fig. 5 showing the arrangement of the upper compartments, and showing by dotted lines the positions of the sleeping berths formed from the seats; Fig. 8 is a sectional elevational view thereof taken through 8—8 of Fig. 7; Fig. 9 is a fragmentary sectional view thereof in plan taken at 9—9 of Fig. 7; Fig. 10 is an enlarged fragmentary sectional elevational view taken at 10—10 of Fig. 5, showing the arrangement of the lower compartments and showing by dotted lines the berths formed from the seats therein; Fig. 11 is a sectional elevational view thereof taken at 11—11 of Fig. 10; Fig. 12 is a fragmentary sectional view thereof in plan taken at 12—12 of Fig. 10; Fig. 13 is a fragmentary sectional elevational view of a slightly modified form of construction and embodiment of my invention having an additional tier of seats and berths arranged above those shown in the other views, the portion here shown being of the rear portion of the vehicle; Fig. 14 is a transverse sectional elevational view taken at 14—14 of Fig. 13; Fig. 15 is a sectional view thereof in plan taken at 15—15 of Fig. 13, showing particularly the arrangement of seats in the upper tier; Fig. 16 is another slightly modified form of construction of the embodiment shown in Figs. 1 to 12, but showing a different arrangement of the floor of the corridor from which access is had to the different compartments; Fig. 17 is a sectional view in plan taken at 17—17 of Fig. 18, showing another modified form of construction of the embodiment of my invention in an automobile stage in which a corridor is provided at one side of the vehicle and the berths therein are arranged transversely with respect to the vehicle; Fig. 18 is a partial sectional and partial elevational view of the front portion of the vehicle, taken at 18—18 of Fig. 17; and, Fig. 19 is a transverse sectional elevational view thereof taken at 19—19 of Fig. 17.

Like characters of reference refer to similar parts and portions throughout the views of the drawings.

The structures and the vehicles shown in all of the views of the drawings are for automobile stages, or automobile stage coaches, particularly adapted for long distance travel. The vehicle or stage bodies 1, shown in various forms in the drawings, are of considerable length and are provided at the front and rear ends of one side with entrance and exit doors 2 and 3 respectively. The entrance and exit platforms 4 and 5 on the inside of the body to which entrance may be made to the body from the outside through the doorways 2 and 3, respectively, are as low as practicable and are preferably only a single step above the roadway.

In the vehicles, or bodies shown in Figs. 1 to 12, inclusive, and 13 to 16, inclusive, I have shown a corridor 6 at the central or longitudinal axial portion of the body, which corridor extends from near the front end of the body, preferably immediately behind the engine compartment 7 thereof, to near the rear end of the body, the rear termination thereof depending upon the location of the passenger compartment at the rear end of the vehicle body. The corridor 6 is elevated considerably above the platforms, or entrance and exit spaces 4 and 5, but is readily accessible therefrom by steps 8 and 9 at the front and rear ends of the corridor.

The floor of this corridor consists of a long platform which forms the upper side or wall 10a of a longitudinal tunnel 10 through which the drive shaft 11 from the power plant in the engine compartment 7 to the rear wheels extends, as shown in Figs. 2, 6 and 11. The portion of the body immediately above the rear axle 12 of the vehicle, as shown in Fig. 6, is preferably also on the same level with the floor of the corridor, and the portions immediately above the rear wheels, as indicated by 13, are raised considerably above the floor level of the corridor. The tunnel 10 may also serve to enclose water conductors, wires, and some portions thereof may be used as storage space, if desired.

At the opposite sides of the corridor are located a plurality of lower compartments 14 and upper compartments 15, the lowest portion of the floor in the compartments 14 being positioned below the floor of the corridor and substantially on a level with the entrance and exit spaces or platforms 4 and 5, while the low floor levels of the compartments 15 are positioned considerably above the floor of the corridor.

Each of the lower compartments 14 and the upper compartments 15 are subdivided into seat or berth compartments 14a and entrance or standing compartments 14b, while the upper compartments are subdivided into seat or berth compartments 15a and standing compartments 15b.

The lower compartments 14 are positioned side by side with the end walls of the seat compartments thereof separated by walls 16, while the upper compartments are also positioned with the ends of the seat compartments thereof separated by end walls 17. The compartments, particularly the seat or berth compartments, at the higher lever are staggered relative to those at the lower level, as shown best in Figs. 2, 7 and 10. The upper tiers, or rows of seat or berth compartments 15a are separated from the lower tiers or rows of seat or berth compartments 14a by common dividing walls 18 which form the bottom walls of the former and the ceiling walls of the latter. Each of the walls 18 are provided with alternate downwardly offset portions 18a and upwardly offset portions 18b which are connected by inclined portions 18c. The portions 18a form the floor or foot space for the upper seat or berth compartments 15a and are positioned intermediate the ends and at the central portions of the upper seat or berth compartments and are also positioned below the portions 18b which form the high ceiling portions of the lower seat or berth compartments 14a intermediate the ends and at the central portions of the latter. Thus, each of the compartments 14a and 15a are provided with as much head room as practicable commensurate with low body construction.

In each of the lower seat or berth compartments 14a are positioned pairs of opposed seats 19, while in the upper compartments 15a are positioned similar pairs of opposed seats 20. The seats in both lower and upper compartments are positioned transversely with respect to the vehicle body. Each of the seats 19 consists of seat cushions 19a, lower seat cushions 19b, and back supporting cushions 19c. Each pair of seats 19, as well as each pair of upper seats 20, are convertible into pairs of superimposed berths. In the former, the seat cushions are pulled outwardly and lowered to the dotted line position and rest upon the floor of the compartment 14a, while the lower seat cushions 19b, over which the cushions 19a are positioned and upon which the same rest, are raised to the dotted line positions so that the upper sides thereof are substantially flush with the cushions 19a in their lowered position. The opposite sides of the back forming cushions 19c are preferably pivotally mounted at their upper ends on links 21 which are pivotally mounted at their opposite ends on the partition walls 16, or on other suitable supports within the compartments 14a. The back forming cushions are raised to the dotted line positions with their lower edges adjacent each other and may be supported at their lower edges on supporting blocks 22 on the outer side wall of the vehicle body, or on straps, not shown, or by both blocks and straps. Thus, two sleeping berths are formed in each compartment in superimposed relation, all as shown best in Figs. 10 and 12 of the drawings. It will be noted that both berths are substantially the full width of the compartments 14a and extend preferably to the extreme ends thereof.

The seats 20 consist of seat cushions 20a, back cushions 20b and auxiliary cushions 20c, the latter being normally concealed from view as the cushions 19b, but behind the back cushions. When converting the two opposed seats in each of the compartments 15a into sleeping berths, the seat cushions 20a are drawn outwardly and lowered to their dotted line positions, while the cushions 20c are laid flat against the upper side of the portion 18b of the dividing wall 18 so that the upper surfaces of the cushions 20a and 20c are all on the same horizontal level. The back cushions 20b are also pivotally mounted at the upper ends of the opposite edges on links 23 which are pivotally mounted at their lower ends on brackets supported by the dividing walls 17, or other suitable supports within the compartments 15a. The lower edges of the cushions 20b are raised, while the upper edges thereof are lowered so that the same assume positions shown by dotted lines in Fig. 7. The free edges of the back cushions 20b may also be supported on blocks 24, or straps, as described above in connection with the seats 19. Thus, two superimposed sleeping berths are also formed from each pair of opposed upper seats 20, said berths also extending between the end and side walls of the compartments 15a and substantially filling the spaces between said walls.

It will be noted that the berths formed from said seats extend forwardly and backwardly and are spaced from the common corridor permitting access to all berths.

It will be also noted that the berths in the upper compartments are positioned over and in overlapping relation with respect to the berths in the lower compartments for economy of space and for reasons to be ascribed hereafter.

The standing spaces, or dressing rooms 14b which connect the common corridor with the compartments 14a are formed of hood shaped walls 25 which enclose the front and rear sides, as well as the top sides of said dressing rooms, as shown in Figs. 2 and 10. These dressing rooms extend downwardly to the floor levels of the seat or berth compartments 14a and extend upwardly above the highest portions of said compartments formed by the portions 18b and 18c of the wall 18. The sides of said dressing rooms adjacent the corridor are open from the floor 10a of the corridor to the upper or ceiling wall of said compartments, while the sides of said compartments adjacent the seat and berth compartments are open below the ceiling walls of the latter, the portions of the latter sides above said ceiling walls being enclosed and forming partial side walls at the opposite ends and inner sides of the seat or berth compartments 15a, as shown in Figs. 2, 7, 8, 9 and 10. Within the compartments 14b, between the floor portions thereof and the floor 10a of the corridor, are steps 26 which facilitate ingress and egress to and from the compartments 14b.

The front and rear side walls of the standing spaces or dressing rooms 15b are formed by the adjacent side walls 25 of the dressing rooms 14b, as shown best in Figs. 2, 7 and 8. The corridor sides of the compartments 15b, as well as the seat or berth compartment sides thereof above the floor portions 18a and 18b, are open. The walls, designated 27, enclosing the inner sides of the compartments 15b below the floor portions 18a and 18b also form partial enclosing walls at the inner sides of the lower seat or berth compartments, as shown in Figs. 2, 7, 10 and 12. The floors of the dressing rooms 15b are formed by platforms 28 which are preferably positioned a single step above the floor of the corridor, as shown best in Figs. 7 and 8. The floor portions 18a of the seat or berth compartments 15a may be a single step above the platforms 28, or there may be provided an additional step 29, as shown in Figs. 2, 7, 8 and 9.

The upper wall portions of the walls enclosing the compartments 14b may be enclosed by rails 30 and form convenient baggage supports, or supports for similar purposes.

The spaces below the platforms 28, which serve as floors for the compartments 15b, and between the side walls of the tunnel 10 and the walls 27 below the platforms 28 may be utilized as storage spaces for baggage, particularly for the lower tier of compartments, these storage spaces being shown as enclosed by doors 31, as shown in Figs. 10, 11 and 12.

In order to provide the greatest amount of light and field of vision for the lower compartments, the windows 32 for such compartments extend preferably the whole distance between the transverse partition walls 16 and to high offset portions 18b of the wall separating the lower from the upper compartments. At the ends of the lower seat or berth compartments 14a, in which the ceiling height is reduced by the portions 18a and 18c, the latter wall portions are cut away at an angle and enclosed by walls 18d which permit rectangular construction of the windows and the admittance of the greatest amount of light, as shown in Figs. 10 and 11.

In order to provide the greatest economy of space, the lower compartments at the left side of the vehicle body are extended forwardly as far as possible. The upper compartments at the left side of the vehicle body are offset backwardly approximately half the length of the lower compartments. Because of the door at the front end of the right side of the vehicle, the seating and berth space at the latter side is correspondingly reduced, but this decrease in overall length may be proportioned between the several compartments and first at the latter side by decreasing the overall length thereof slightly without decreasing the capacity.

The spaces immediately above the rear wheels and below the rear ends of the rear upper compartments, may be utilized as storage spaces for baggage, or for other purposes.

If desired, there may be placed at the rear end of the vehicle body, behind the wheels, and at the side opposite the rear entrance door 3, another lower compartment consisting of a pair of opposed seats which may be converted into a pair of superimposed berths, as indicated by 33 in Fig. 6.

The space at the right side of the rear end of the vehicle body immediately behind the rear wheels and forwardly of the rear entrance doors 3, which is too short for other sleeping berths, may be utilized as a toilet room, designated 34 in Fig. 6. There may be also provided seats 35 at the rear end of the body behind the rear wall of the toilet, which may be used as observation seats.

Above the engine compartment 7, is a platform 36 which forms the floor of the driver's compartment at the front end of the vehicle body, as shown in Figs. 1, 2 and 5. This platform is a considerable distance above the corridor floor and is accessible by a step 37. At one side of the driver's compartment are the driving controls and the driver's seat 38 which is positioned above the platform 36 and a considerable distance above the roadway. At the opposite side of the driver's compartment are other seats 39 which may be occupied by passengers for observation purposes.

The spaces within the stage body immediately inside of the entrance and exit doors are usually waste spaces. In my construction, as shown in Fig. 6, I have utilized the space 4 immediately in front of the front entrance and exit door 2 as the floor space of a kitchenette and the spaces 40 and 41 immediately forwardly and backwardly therefrom as storage and cabinet spaces for the kitchenette or buffet. In the space 40 I have shown a refrigerator 42 and a sink 43, and in the space 41, a cabinet 44 and a stove 45. The space 40, as shown, is located below the seats 39, while the space 41 is located forwardly of the forward lower seat or berth compartment at the right side of the vehicle and below the forward end of the forwardly positioned upper seat or berth compartment. The spaces 40 and 41, when not in use, may be enclosed by double hinged doors 46 and 47, respectively, which doors, when opened, may be folded together and may serve as swinging doors between the space 4 and the interior of the body for separating the kitchenette from the other portions of the vehicle body. These doors, however, are so arranged that the front exit and entrance is not obstructed at any time.

In the modified form of construction shown in Figs. 13, 14 and 15, the lower portion of the body comprising the lower compartments 14 and the next upper compartments 15 are arranged substantially as in the construction shown in Figs. 1 to 12, inclusive, but in the modified construction I have eliminated the standing spaces or dressing rooms between the corridor and the compartments occupied by the seats or berths, and instead have widened the seats and berths the full width between the corridor and the outside walls of the body, thus doubling the seating and sleeping spaces therein, but eliminating the convenience of the entrance and exit means thereto and the convenience of the private dressing rooms. In this modified structure, I have arranged an additional upper tier of seats and berths in compartments 48 which are arranged similar to the compartments 15 immediately below, the lowest portions 49a of the common dividing wall 49 between the compartments 15 and 48 forming the floor and foot spaces for the compartments 48 and being positioned below the level of the portions 49b of the wall 49, which portions 49b form the high ceiling portions for the compartments 15.

The seats 50 in the upper compartments 48 may be the same as the seats 20 in the compartments 15.

Access may be had to the upper compartments 48 from a corridor 51 separate and apart from and positioned above the lower corridor 6 from which access may be had to the compartments 14 and 15. The floor 52 of the corridor 51 may be positioned below the lower floor levels of the upper compartments 48 so as to provide greater head room for the upper tier of compartments.

Access may be had to the upper corridor 51 from a circular stair 53 at the extreme end of but within the vehicle body, the lower end of the stair terminating in front of the rear entrance and exit door and the upper end of the stair terminating substantially at the rear end of the floor 52 of the corridor 51.

At the left side of the vehicle body, rearwardly of the rear lower compartments 14 and the upper compartments 48 may be toilet rooms 54 and 55, respectively, which are respectively accessible from the lower corridor and the upper corridor.

The modified structure shown in Fig. 16 is, or may be, substantially the same as that shown in Figs. 1 to 12, inclusive, but instead of a flat level floor 10a for the corridor, I have shown a substantially wavy floor 56, the low portions thereof being positioned opposite the lower compartments 14 and the crest portions thereof being positioned opposite the upper compartments. Thus, at least one step to each compartment may be eliminated.

In the modified structures shown in Figs. 17, 18 and 19, the corridor, designated here as 57, is positioned at one side of the vehicle and in this instance at the right side forming substantially a direct connection between the front and rear entrance and exit doors. The floor of the corridor 57 is in this instance also raised above the floor spaces or platforms immediately inside of the entrance and exit doors.

Between the corridor and the opposite side of the vehicle body are arranged the lower compartments 58 and the upper compartments 59 which are arranged above and in staggered relation with each other in a manner similar to that described in connection with the other structure, but with greater downwardly and upwardly offset portions. The dividing wall between the lower and upper compartments consists substantially of a horizontal wall 60 having alternate downwardly offset portions or pockets 60a and upwardly offset portions or pockets 60b. The offset portions 60a serve as foot spaces for the upper compartments 59 and increase the height therein to a convenient standing height, while the offset portions 60b serve as head clearance spaces so as to provide standing height for the lower compartments 58.

The compartments 58 and 59 may be closed and separated from the corridor by doors 61 and 62 which are positioned directly opposite the upwardly offset portions 60b and the downwardly offset portions 60a.

The seats in this construction are also positioned transversely with respect to the vehicle but the sleeping berths, formed from the seats, are positioned also transversely with respect to the vehicle instead of longitudinally as in the other structures. The seat cushions 63a of the seats 63 in the upper compartments rest preferably directly on the upper sides of the main separating horizontal wall 60 at the opposite sides of the downwardly offset portions 60a and abut against the upwardly offset portions 60b at the inner edges of the seat cushions. The back forming cushions 63b, which may rest upon the seat cushions 63a are positioned at the opposite sides of the upwardly offset portions 60b when forming the back rest of the seat and are adapted to be raised to horizontal positions, as shown by dotted lines in Fig. 18, for forming upper berths directly above the lower berths formed by the cushions 63a. The outer edges of the back forming cushions, when the same are raised to horizontal positions may be suspended from the ceiling of the vehicle body by straps, as shown by dotted lines and designated 64 in Fig. 18.

At the upper side of the upwardly offset portions 60b are positioned other cushions 65 which, together with the cushion 63b of one of the seats in each compartment, form double upper berths. It will be noted, however, that each upper compartment includes preferably only one of such double berths so that the space within each of the compartments is substantially the same.

It will be here noted that when the upper compartments are used merely for seating the passengers, the full depth of the offset portions 60a may not be necessary for convenience in seating. Therefore, a second higher bottom 66 may be provided in such downwardly offset portions. This bottom 66 may be in the form of a pair of narrow hinged members or doors which may be folded upwardly. The space below such floor doors may be utilized for storing bedding for the berths. When the bedding is removed, said floor doors may be lowered for increasing the head room when using the compartments for sleeping berths. The end wall of the compartment below the floor doors 66, as indicated by 67 in Fig. 19, may be also hinged and when in an upright position, as shown, may be employed to support the doors as a floor, and when folded downwardly, preferably into a recess, designated 63c, will be out of the way and permit the floor doors to be folded downwardly.

The seats 68 are similar in construction to those in the upper compartments and consist of seats cushions 68a and back forming cushions 68b. The seat cushions rest on raised platforms or supports 69 which extend above the floor level of the lower compartment and are positioned at the opposite sides of the foot space or central aisle extending to and from the door. The back forming cushions 68b in the lower compartments may also be raised to horizontal positions, as shown by dotted lines, for forming the upper berths in the lower compartments, the same being supported by straps, as shown by dotted lines and designated 70, when such cushions are used as berths.

It will be here noted that in the lower compartments, all upper berths are single. However, the space below the downwardly offset portions 60a is utilized as sleeping space. Therefore, one of the seat cushions, designated 68c is considerably wider than the other and extends to the space underneath the downwardly offset portions 60a and forms a double berth. The lower compartments are also so arranged that only one double berth is formed in each compartment.

Thus, five passengers may conveniently sleep in one compartment, providing utmost economy of space and also ample head room in each compartment, commensurate with low body construction and ready accessibility at all times to all compartments, seats and berths.

In this modified form of construction, the space immediately in front of the forward lower compartment, at the side of the vehicle opposite the entrance, may be utilized for forming a pair of single superimposed berths formed from opposed seats, as described in connection with the structures as shown in Figs. 1 to 16, inclusive.

The toilet room in this instance may be located at the extreme rear end of the vehicle body and at one side, as shown in Fig. 17.

Though I have shown and described a particular construction, combination and arrangement of parts and portions, and certain modifications thereof, and particular adaptation of my structure to automobile stages, I do not wish to be limited to the particular construction and arrangement, nor to the modifications, nor to the particular adaptations, but desire to include in the scope of my invention the constructions, combinations and arrangements substantially as set forth in the appended claims.

Having thus described my invention, what I claim as new and desire to secure by Letters Patent is:

1. In a structure of the class described, a plurality of compartments arranged on a lower and a higher level, the compartments on each level being positioned side by side and those on the higher level being positioned in staggered relation relative to those on the lower level, said structure having a corridor permitting access to the compartments on the different levels, berths in said compartments, there being provided dressing rooms in said compartments between said corridor and said berths.

2. In a structure of the class described, a plurality of compartments arranged on a lower and a higher level, the compartments on each level being positioned side by side and those on the higher level being positioned in staggered relation relative to those on the lower level, the floor levels of the compartments at the higher level being positioned below the highest ceiling levels of the compartments at the lower level, said structure having a corridor permitting access to the compartments on the different levels, berths in said compartments, there being provided dressing rooms in said compartments between said corridor and said berths.

3. In a structure of the class described, a plurality of compartments arranged on a lower and a higher level, said structure having a corridor permitting direct access to the compartments on the different levels, pairs of superimposed berths in each of said compartments, there being provided dressing rooms in said compartments between said corridor and said berths, both of the berths in each compartment being accessible from the dressing room of the compartment in which the berths are located.

4. In a structure of the class described, a plurality of compartments arranged on a lower and a higher level, the lower floor levels of the compartments at the higher level being positioned below the high ceiling levels of the compartments at the lower level, said structure having a corridor permitting access to the compartments on the different levels, pairs of superimposed berths in said compartments, there being provided dressing rooms in said compartments between said corridor and said berths, both of the berths in each compartment being accessible from the dressing room of the compartment in which the berths are located.

5. In a structure of the class described, a plurality of compartments arranged on a lower and a higher level, said structure having a corridor permitting direct access to the compartments on the different levels, seats positioned in said compartments, there being provided a standing space in said compartments between said corridor and said seats.

6. In a structure of the class described, a plurality of compartments arranged on a lower and a higher level, said structure having a corridor permitting access to the compartments on the different levels, pairs of seats positioned in each compartment, there being provided a standing space in said compartments between said corridor and said seats, each pair of seats being convertible into a pair of superimposed sleeping berths, each accessible from said standing space, said standing space serving as a dressing room for each of the berths in its corresponding compartment.

7. In a structure of the class described, having a plurality of compartments positioned on different levels, and a common corridor positioned above the floor level of the compartments at the lower level and below the floor level of the compartments at the higher level, steps permitting access to the compartments at the lower level, other steps permitting access from said corridor to the compartments at the higher level, and seats in said compartments, each of said compartments having a standing space positioned between said corridor and said seats and separated from the adjacent compartments.

8. In a structure of the class described, having a plurality of compartments positioned on different levels, and a common corridor positioned above the floor level of the compartments at the lower level and below the floor level of the compartments at the higher level, steps permitting access to the compartments at the lower level, other steps permitting access from said corridor to the compartments at the higher level, and seats in each of said compartments, each of said compartments having dressing rooms connecting with said corridor and positioned between the corridor and said seats, separated from adjacent compartments, and accessible from said steps.

9. In a structure of the class described having a plurality of compartments positioned at different levels, the lower portions of the floors of the compartments at the higher level being positioned on a level below the high portions of the ceilings of the compartments at the lower level, said structures having a common corridor permitting access to each of said compartments at the lower and higher levels, seats arranged in each of said compartments, each of said compartments having standing spaces between said corridor and said seats.

10. In a structure of the class described having a plurality of compartments positioned at different levels, the lower portions of the floors of the compartments at the higher level being positioned on a level below the high portions of the ceilings of the compartments at the lower level, said structure having a common corridor permitting access to each of said compartments at the lower and higher levels, and seats arranged in each of said compartments, each of said compartments having dressing rooms communicating with said corridor and positioned between the corridor and said seats, a portion of the walls forming the dressing roms for the lower compartments extending into the upper compartments and forming side walls for the seats therein and a portion of the walls forming the dressing rooms for the upper compartments forming side walls at the side of the seats in the lower compartments.

11. In a structure of the class described having a plurality of compartments positioned at different levels, the compartments at each level being positioned side by side and in staggered relation to the compartments at the lower level, and having a common corridor permitting access to the compartments at the lower and at the upper levels, a platform elevated above the level of the corridor and positioned below the floor level of the upper compartments, the space below said platform forming a storage space for the occupants of the adjacent lower compartments.

12. In a structure of the class described having a continuous unbroken corridor from front to rear and a plurality of compartments positioned at different levels and in staggered relation to each other, each communicating directly with said corridor, the floor levels of the compartments at the lower level being positioned below the level of the floor of said corridor and the floor levels of the upper compartments being positioned above the level of the floor of the corridor, steps arranged in the compartments at the lower level permitting ready access from said corridor to the latter compartments, and other steps positioned in the compartments at the higher level permitting ready access from said corridor to said latter compartments.

13. In a structure of the class described having a continuous and unbroken corridor from front to rear and a plurality of compartments positioned at different levels and in staggered relation to each other, each communicating directly with said corridor, the floor levels of the compartments at the lower level being positioned below the level of the floor of said corridor and the floor levels of the upper compartments being positioned above the level of the floor of the corridor, steps arranged in the compartments at the lower level permitting ready access from said corridor to the latter compartments, and other steps positioned in the compartments at the higher level permitting ready access from said corridor to said latter compartments, said steps being positioned to the side of the normal walking space in said corridor.

14. In a vehicle structure of the class described having entrance and exit means and floor spaces at said entrance and exit means slightly above the roadway and having a corridor extending from front to rear, the floor level of said corridor being positioned above the floor spaces at said entrance and said exit means, and also having a plurality of compartments at the side of the corridor, some of said compartments being positioned at a high level and the others at a low level, the floor levels of the compartments at the lower level being substantially on the level of said first mentioned floor spaces and below the floor level of the corridor, the floor levels of the compartments at the higher level being positioned above the floor level of said corridor, and fixed steps arranged to the side of the normal walking space of said corridor permitting ready access to the compartments at both the lower and higher levels.

15. A vehicle structure of the class described, having a central corridor, standing spaces immediately to the sides of said central corridor, and passenger compartments positioned outwardly from said standing spaces with respect to said corridor and communicating through said standing spaces with said corridor.

16. A vehicle structure of the class described having a central corridor, standing spaces immediately to the sides of said central corridor, and low passenger compartments positioned outwardly from said standing spaces with respect to said corridor and communicating through said standing spaces with said corridor, said standing spaces extending above the upper portions of said passenger compartments.

17. A vehicle structure having a central corridor, open berths at its opposite sides, and dressing rooms positioned between said corridor and said berths immediately adjacent to both.

18. A vehicle structure having a central corridor, compartments at its opposite sides, and dressing rooms positioned between said corridor and said compartments immediately adjacent to both, said compartments having berths, said dressing rooms extending considerably higher than the upper portions of the compartments in which the berths are positioned.

19. In a vehicle, a body structure having an entrance at one end and spaces along the side wall of the body immediately adjacent and at the opposite sides of the entrance, said spaces forming together with the space in front of said entrance a kitchenette, folding doors mounted over each of said first mentioned spaces and adapted when folded and swung outwardly to form a swinging door between the interior of the body and said kitchenette.

20. In a vehicle, a body structure having an entrance opening, a platform immediately within the entrance opening, and an aisle therein accessible from said platform, there being provided cupboards in the body at the opposite sides of the platform and entrance opening, and doors for the cupboards, said doors being hinged adjacent the aisle and adapted to swing from the cupboards toward the aisle for enclosing the platform from the aisle and permitting free and simultaneous access to the cupboards at the opposite sides, said doors permitting passage at all times between the aisle and the entrance opening when said kitchenette is in use and the cupboards open.

In testimony whereof, I have hereunto set my hand at Los Angeles, California, this 27th day of March 1928.

DWIGHT E. AUSTIN.